May 23, 1967 A. E. COOKE 3,321,755
STOP MEANS FOR TEXTILE MACHINES
Filed June 12, 1964
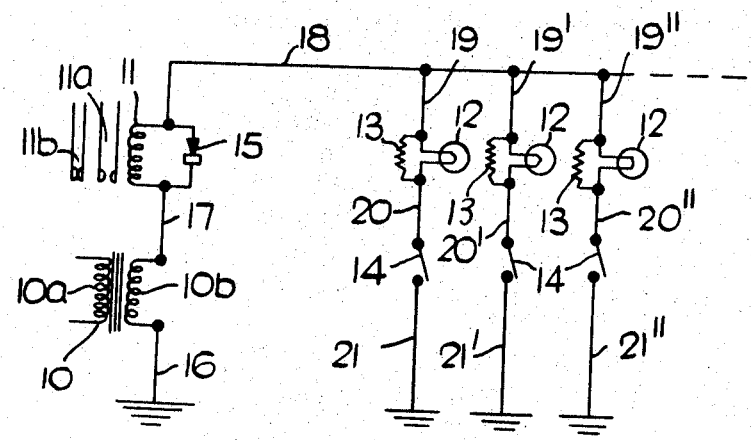
Albert Edward Cooke
By Felix A. Russell
Attorney

# United States Patent Office 3,321,755
Patented May 23, 1967

3,321,755
STOP MEANS FOR TEXTILE MACHINES
Albert E. Cooke, Leicester, England, assignor to
Trip-Lite Limited, Leicester, England
Filed June 12, 1964, Ser. No. 374,673
Claims priority, application Great Britain, June 14, 1963,
23,812/63
10 Claims. (Cl. 340—419)

This invention is for improvements in or relating to stop means for textile machines and has for one of its objects to provide a sensitive and effective warning system by means of which the operation of an individual stop motion or a stop motion in a particular group thereof can be readily discerned.

In knitting the other textile machines there are frequently provided for supply to each machine a substantial number of different yarns which are led from individual packages. For efficient working it is important to have each different yarn provided with at least one fault detector, with the detectors arranged to stop the operation of the machine in the event of yarn failure or fault (such as unduly high or low tension) at any point. In a knitting machine detectors are also required to be provided in connection with the knitting elements and at other points on the machine and to be arranged to stop the machine in the event of a fault occurring. The fault detectors are commonly in the form of or incorporate electric switches for controlling the energisation of an electrically operated device by which stoppage of the machine is effected. It is usual for the detector switches to be connected in parallel with one another and the group thereof connected in series with a relay or other actuator so that, when any of the detectors is actuated by a fault condition, a current is caused to flow from a supply through the detector switch and relay which then becomes energised and by one of a variety of means causes the machine to be brought to a standstill. Such an arrangement suffers from the disadvantage of risk of failure of the switch contacts due to arcing from strong surge currents set up when the relay coil is energised and deenergised, which risk can be reduced by employing spark quenching circuits.

With a stop motion arrangement employing a multiplicity of detectors it is furthermore important to provide some means of indicating at which detector or in which groups of a small number of detectors a fault has occurred. This is usually provided by including a small lamp in association with each detector or with each of several groups of detectors so that when a fault occurs the appropriate lamp will be illuminated to indicate the position or the neighborhod of the fault. The provision of lamp indicators has also introduced a number of disadvantages as the lamps cannot normally be in circuit with the line carrying the actuator current since the lamp current and actuator current cannot be matched. Consequently an additional wire to each stop motion has been provided which greatly complicates the circuiting and adds to the cost of materials and labour involved in providing the stop motion arrangement. Moreover with existing arrangements the provision of sensitive switches at the stop motion detectors is hampered by the tendency for surge currents to develop at certain times making it necessary to employ heavier switch parts than would otherwise be needed. The invention seeks to provide a system in which these disadvantages are partly or wholly overcome.

In accordance with the invention there is provided a stop motion system for a textile machine wherein detector switches and associated indicators are connected in circuit with an alternating current supply and with an actuator for effecting stoppage of the machine when a fault occurs, said actuator being shunted by a diode rectifier. Desirably the actuator is designed for direct current operation and may take the form of a direct current relay. By this arrangement, on the occurrence of a fault, current is allowed to flow through two paths in the circuit, one through the actuator and the other through the diode rectifier, one half wave of the alternating current causing a current flow in one direction through the actuator and the other half wave causing an opposite current flow through the diode rectifier and by-passing the actuator to be used for energising the appropriate indicator. By this arrangement the wiring is simplified since the same connections to the detector switches serve for connecting them to the indicators as well as to actuator circuit.

It is advantageous to employ as the diode rectifier shunting the actuator one having a low resistance value such as one of the semi-conductor type, examples being silicon and germanium semi-conductors. By having a diode rectifier of this kind shunting the coil of the actuator any surge currents tending to be set up in such coil are quenched, and this permits the parts of the detector switches to be made of light weight and sensitive construction.

A suitable circuit arrangement for use in practising the invention comprises a voltage step down transformer the output coil of which is connected in series with a coil of a relay forming the actuator and also connected in series with a group of indicator lamps connected in parallel with one another and each in the circuit of a separate detector switch. The circuit may be completed through an earth return by contacts of the detector switches on one side being connected to the machine frame and one terminal of the transformer output coil being similarly connected to the machine frame.

The indicators associated with the detector switches may take the form of lamps the holders for which may be provided each with a shunt resistance of appropriate value to allow passage of sufficient current to operate the actuator in the event of a lamp failure.

A convenient stop motion system in accordance with the invention is illustrated by way of example in the accompanying drawing and will now be described with reference to the drawing which consists of a circuit diagram indicating the connections of the parts shown therein diagrammatically.

In the drawing there is shown a transformer 10 having input and output coils 10a and 10b, a coil 11 being the operating coil of a relay forming the actuator, a plurality of indicator lamps 12 each having a shunt resistance 13 which may be provided on the lamp holders, the lamps 12 being associated with detector switches 14 of light weight construction being fault detectors. The latter are associated with individual yarns and arranged to respond to breakage of the yarn or a fault (such as an unduly high or low tension) developing in the yarn. There is also shown a diode detector 15 which is connected in parallel with the coil 11.

The circuit shown is energised from the output coil 10b of the transformer 10 which has one end connected by a lead 16 to earth and the other end connected by lead 17 to the actuator coil 11. The other end of the coil 11 is connected by a common lead 18 to leads 19, 19', 19" etc. which extend to the individual lamps 12. The other terminals of the lamps 12 are connected by leads 20, 20', 20" etc. each to one terminal of the associated detector switch 14 the other terminals of which are connected by leads 21, 21', 21" etc. to earth, i.e. the frame of the machine in which the detector devices are provided.

The transformer 10 is of a type which is arranged to step down the supply voltage to a safety level, so that the detector switches 14 the circuit of relay coil 11 operate at a safe low voltage. The relay whereof the coil is shown at 111 is preferably designed for direct current operation and includes switch contacts 11a and 11b organised to control the required circuits for starting and stopping the machine with which the detector devices are associated. The machine control circuits are so arranged that on energisation of relay coil 11 by a fault detection the machine is stopped and will remain stopped until the fault has been located and has been corrected.

The circuit illustrated is energised by the transformer winding 10b and so long as all of the detector switches 14 are held open by their yarns no current will flow through the relay coil 11 and the relay will be in a setting in which the drive to the machine in which the yarns are taken up, such as a knitting machine or warping machine, will be maintained assuming the drive circuits have been initially energised. Should a fault occur at one of the yarns either by yarn breakage or an undesired change in yarn tension, the appropriate detector switch 14 will be caused to close and will complete a circuit through its own particular lamp circuit and the leads 16, 17 and 18 and earth return to energise the relay coil 11 thereby causing the relay to be actuated to effect stoppage of the machine. At the same time the appropriate warning lamp 12 has its circuit completed and will light up to indicate the position of the fault.

By reason of the provision of the diode detector 15 shunting the coil 11 the circuit shown is made practicable by avoidance of the difficulties aforementioned and it is made possible to employ switches at 14 which are of light weight and sensitive construction with their contacts in series with the respective lamps 12 so that only one set of wiring is required for both the indicator lamps 12 and the detector switches 14. The diode detector 15 provides a current path in one direction which is unaffected by the impedance of the coil 11 thereby permitting sufficient current to pass for illumination of the indicator lamps 12 even though quite a substantial number of these may be employed. On the other hand the diode detector 15 acts also as a quenching device for short circuiting any surge currents which may be induced in the coil 11 by rapid closing and opening of its circuit by means of the detector switches 14. Thus such surge currents are prevented from harming the contacts of the light weight and sensitive switches 14.

It is found particularly advantageous to employ as the diode detector 15 one having a low resistance value. Suitable rectifiers are those of the semi-conductor type, examples being silicon and germanium semi-conductors. The important characteristics of the diode detector to be employed are that it shall have a low resistance value and a current handling capacity sufficient to supply current for the required number of lamps or indicators in circuit which might conceivably become energised at the same time. It is also desirable that the size of the rectifier should be as small as possible and the semi-conductors referred to are particularly suitable for this purpose. The nominal voltage required to operate the system is that of the lamps added to that required for operating the coil 11 or actuator. Both the diode detector 15 and the transformer coil 10b must of course be capable of passing the total current consumption of all lamps 12 or other indicators.

If it is desired to use any of the detector switches 14 without a lamp 12 or other warning indicator, a resistance of approximately the same value as that of the lamp or other indicator should be connected in circuit in place thereof to avoid the possibility of over-loading the rectifier 15.

Instead of employing a relay as the actuator for effecting stoppage of the machine when required, any other suitable form of actuator may be used, further other forms of warning devices may replace the lamps 12.

By acting as a low shunting resistance across the coil 11 the rectifier 15 by-passes one half wave of the alternating current leaving the other half wave to energise the actuator coil 11 when its circuit is completed. The rectifier 15 at the same time effectively prevents generation of surge currents through the indicator circuits which would otherwise have to be passed by the detector switches 14.

What I claim is:

1. In a stop motion system for a textile machine, the combination comprising a plurality of detector switches, indicators associated respectively with said switches, an actuator including an energizing coil for effecting machine stoppage, circuit connections connecting said detector switches in parallel arrangement each with an indicator in its circuit, other circuit connections connecting the plurality of detector switches and indicators as a group in series with the energizing coil of said actuator for energization from an alternating current supply, and a diode rectifier shunting said energizing coil.

2. The combination as claimed in claim 1 wherein the actuator is one designed for operation by uni-directional current passing through its energizing coil.

3. The combination as claimed in claim 2 wherein the actuator is constituted by a direct current relay.

4. The combination as claimed in claim 1 wherein the diode rectifier is one having a low resistance.

5. The combination as claimed in claim 1 wherein the diode rectifier is a semi-conductor type rectifier.

6. In a stop motion system for a textile machine, the combination comprising a voltage step down transformer having output connections, a stop motion actuator having an energizing coil, a plurality of detector switches each with an associated indicator, electrical connections connecting the indicators respectively in series each with its appropriate detector switch, other electrical connections connecting the group of detector switches and indicators in series with the energizing coil of the stop motion actuator and with the output connections of the transformer, and a diode rectifier shunting the said energizing coil.

7. The combination according to claim 6 wherein the actuator is constituted by a direct current relay having switch contacts organized to control starting and stopping of the machine.

8. The combination according to claim 6 wherein the indicators take the form of lamps and wherein holders for said lamps are provided and have shunt resistances fitted to them of appropriate value to allow passage of sufficient current to operate the actuator in the event of lamp failure.

9. The combination according to claim 6 having an additional detector switch used without an indicator, connections connecting the additional detector switch in parallel with the other detector switches, and a resistance approximately equal to that of an indicator connected in series with said additional detector switch.

10. The combination according to claim 6 wherein the diode rectifier is a semi-conductor selected from the group consisting of silicon and germanium semi-conductors.

References Cited by the Examiner

UNITED STATES PATENTS

| | | | |
|---|---|---|---|
| 2,503,011 | 4/1950 | Tschumi | 340—176 X |
| 2,673,947 | 3/1954 | Winther | 317—156 |
| 2,880,381 | 3/1959 | Antonevich | 340—222 |

NEIL C. READ, *Primary Examiner.*

R. M. ANGUS, D. L. TRAFTON, *Assistant Examiners.*